United States Patent Office 2,962,068
Patented Nov. 29, 1960

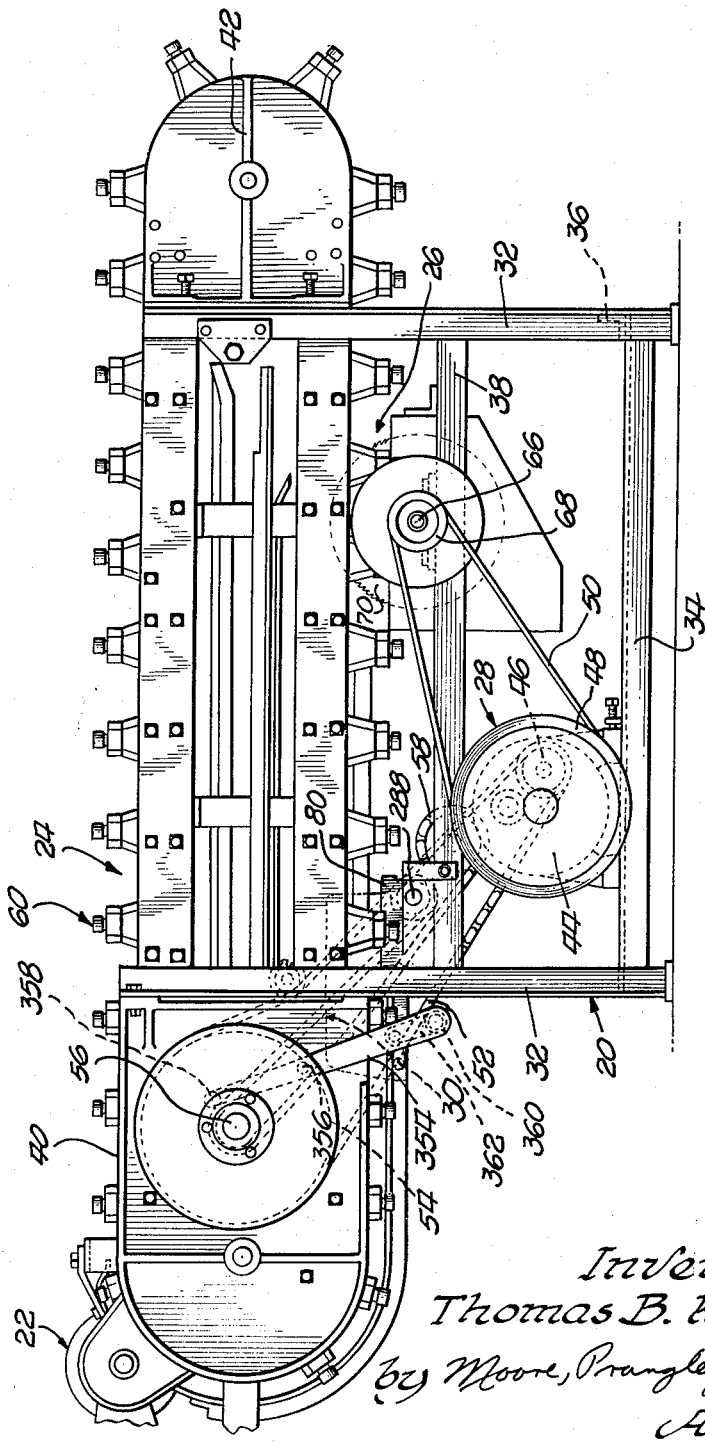

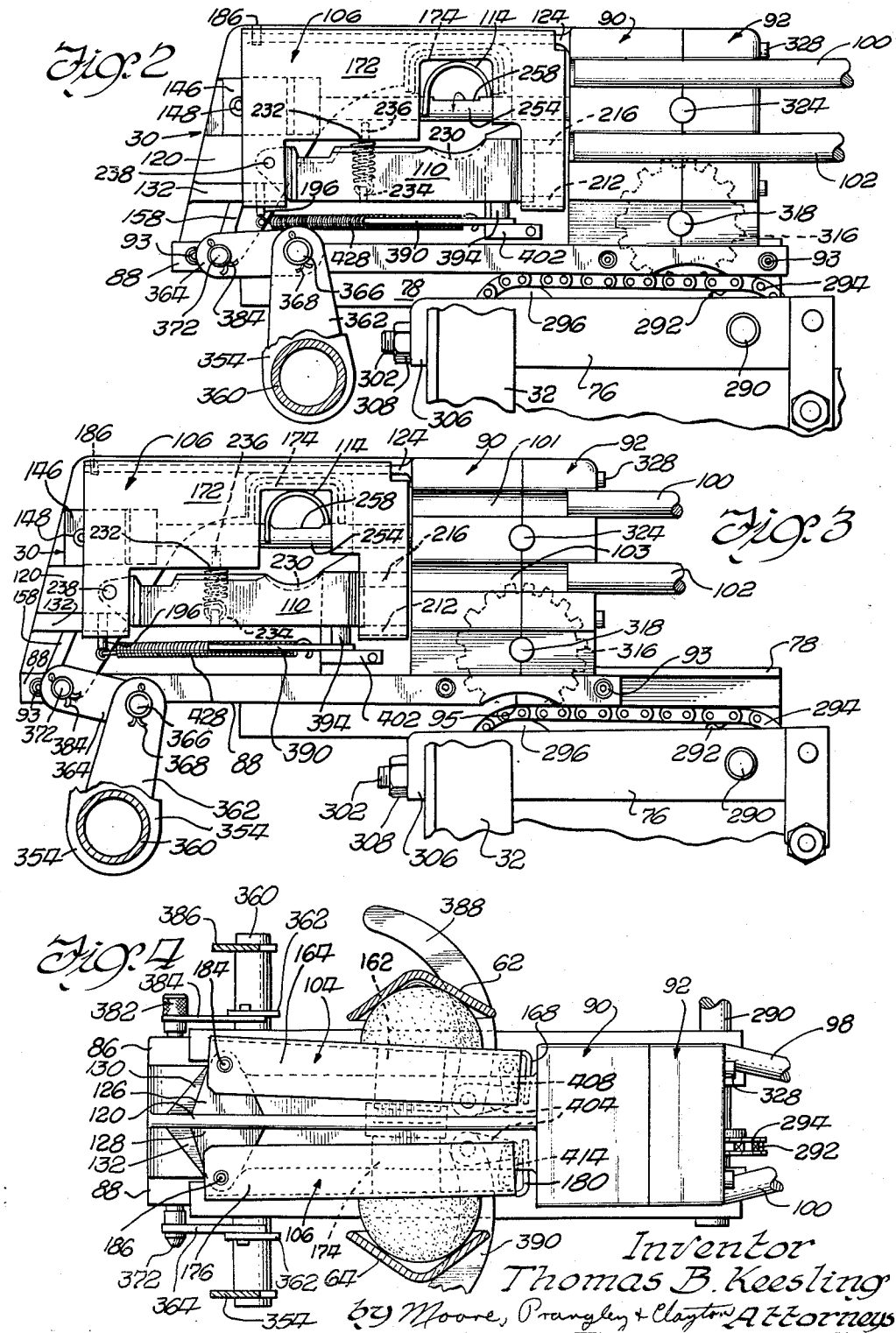

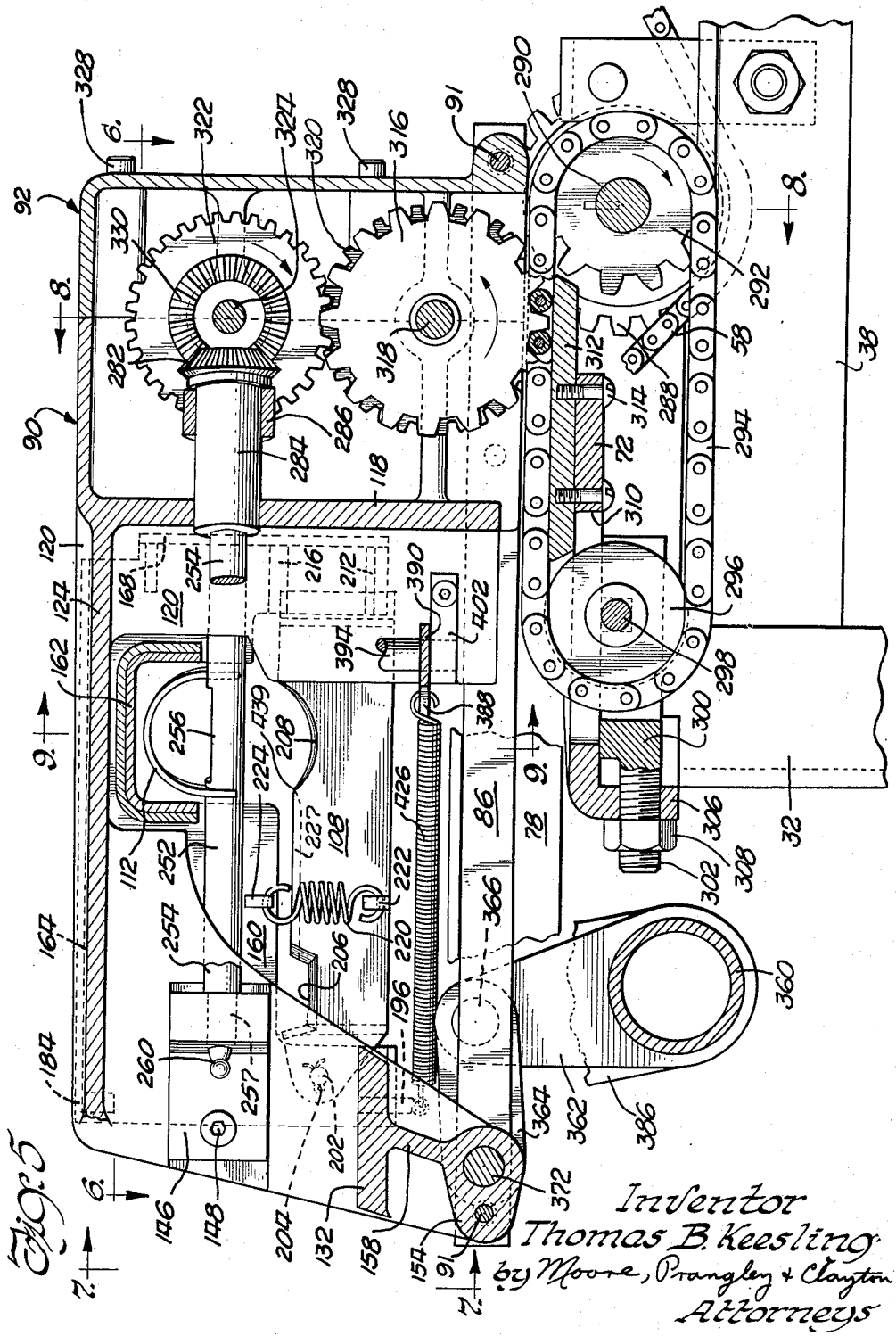

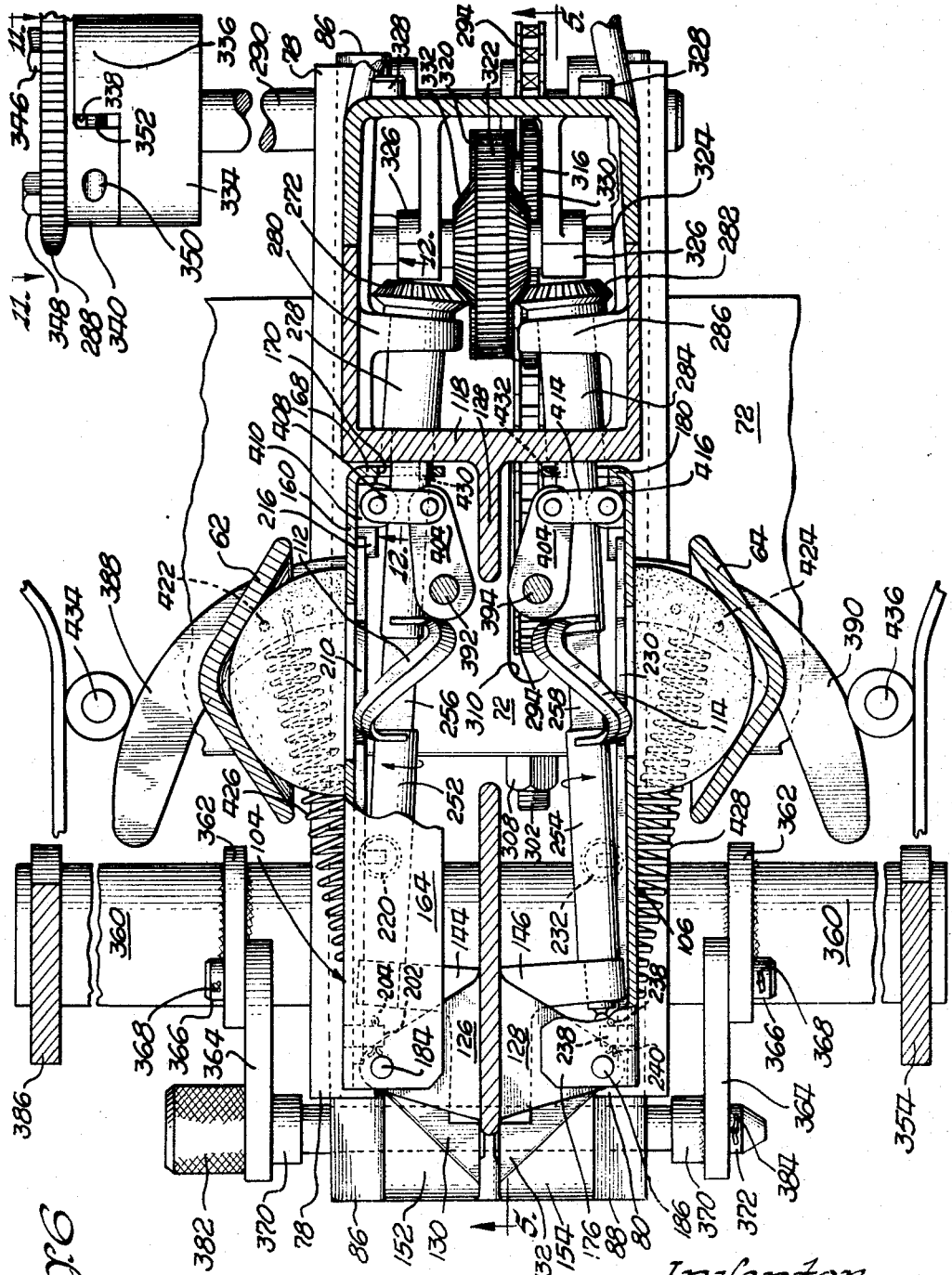

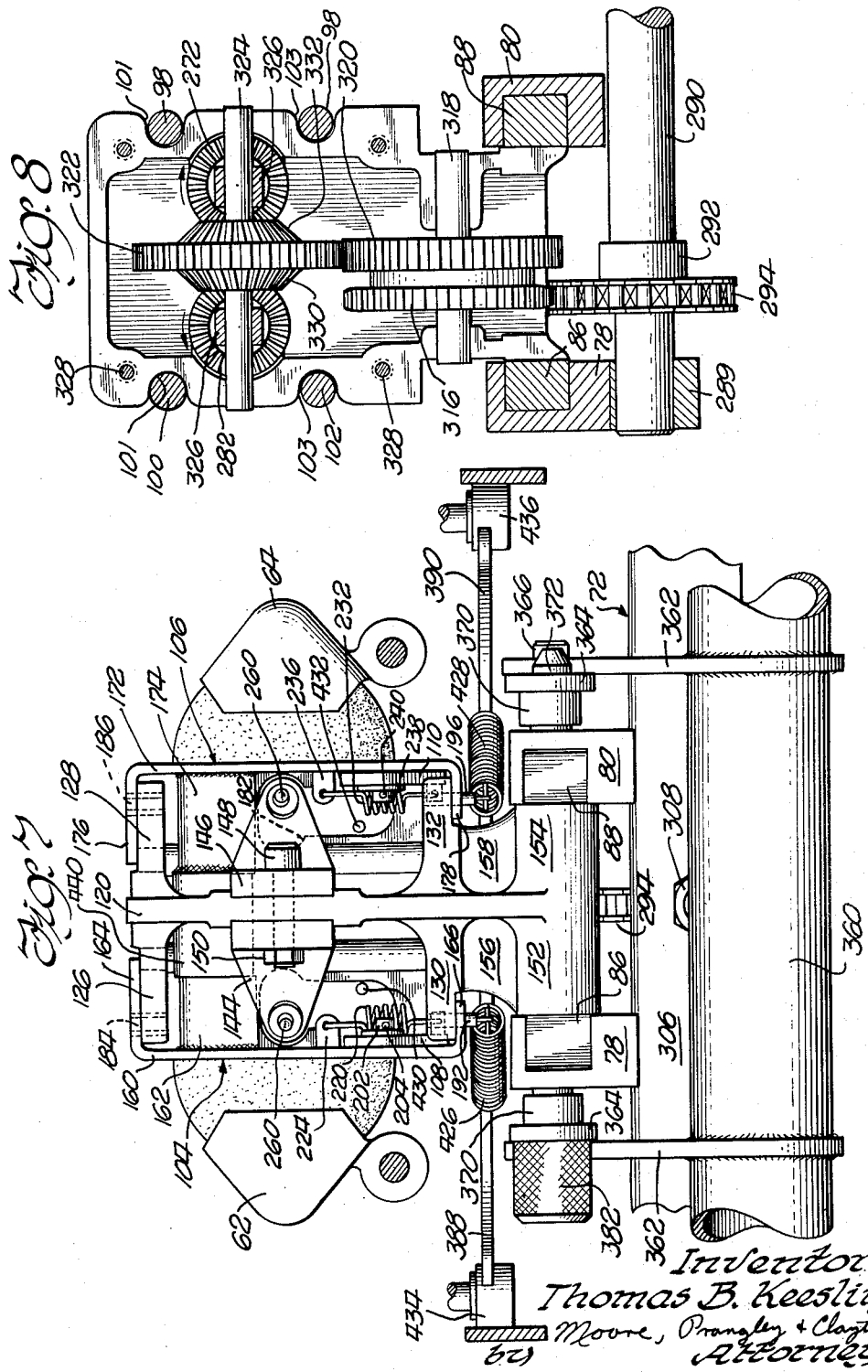

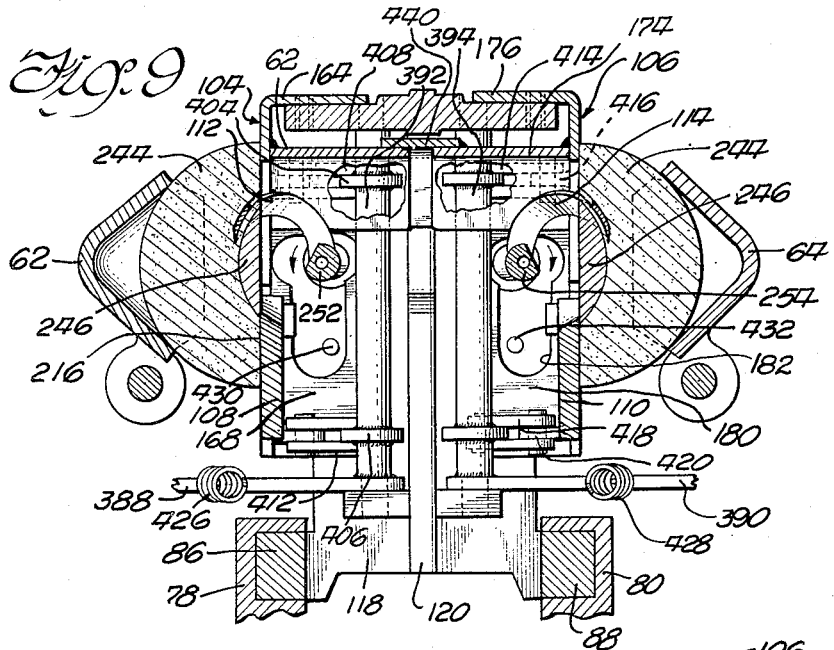
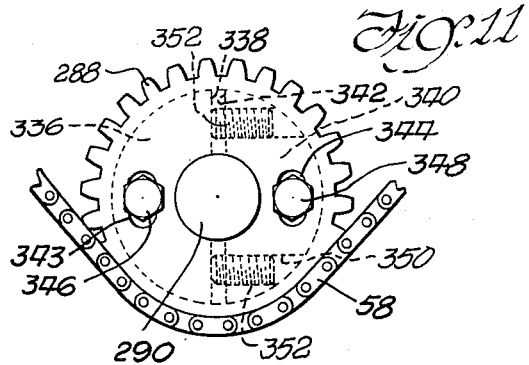
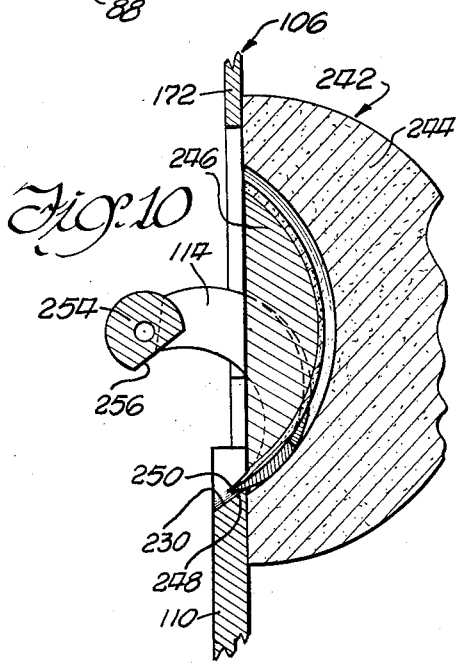
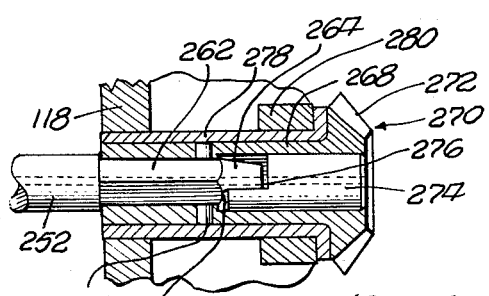

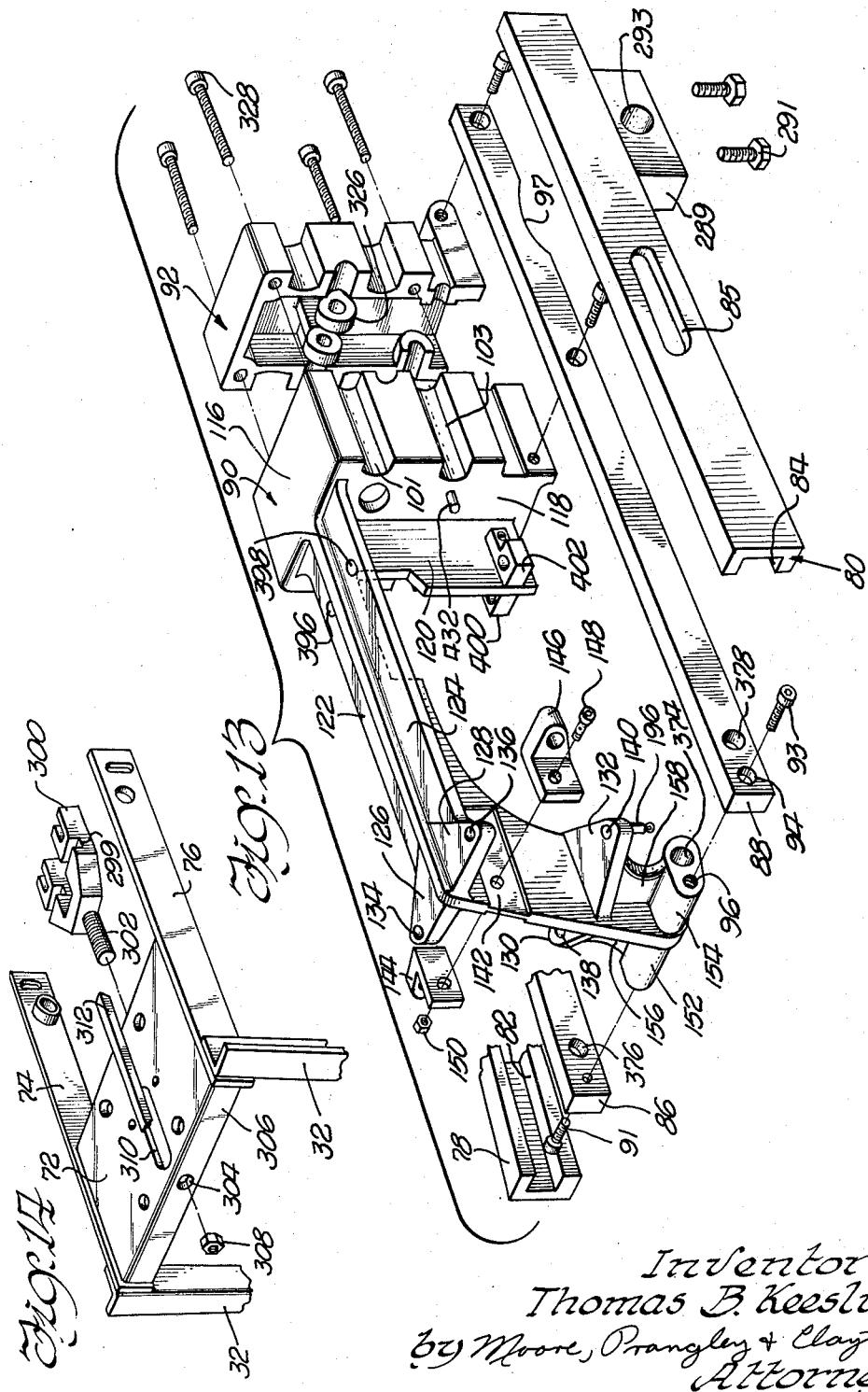

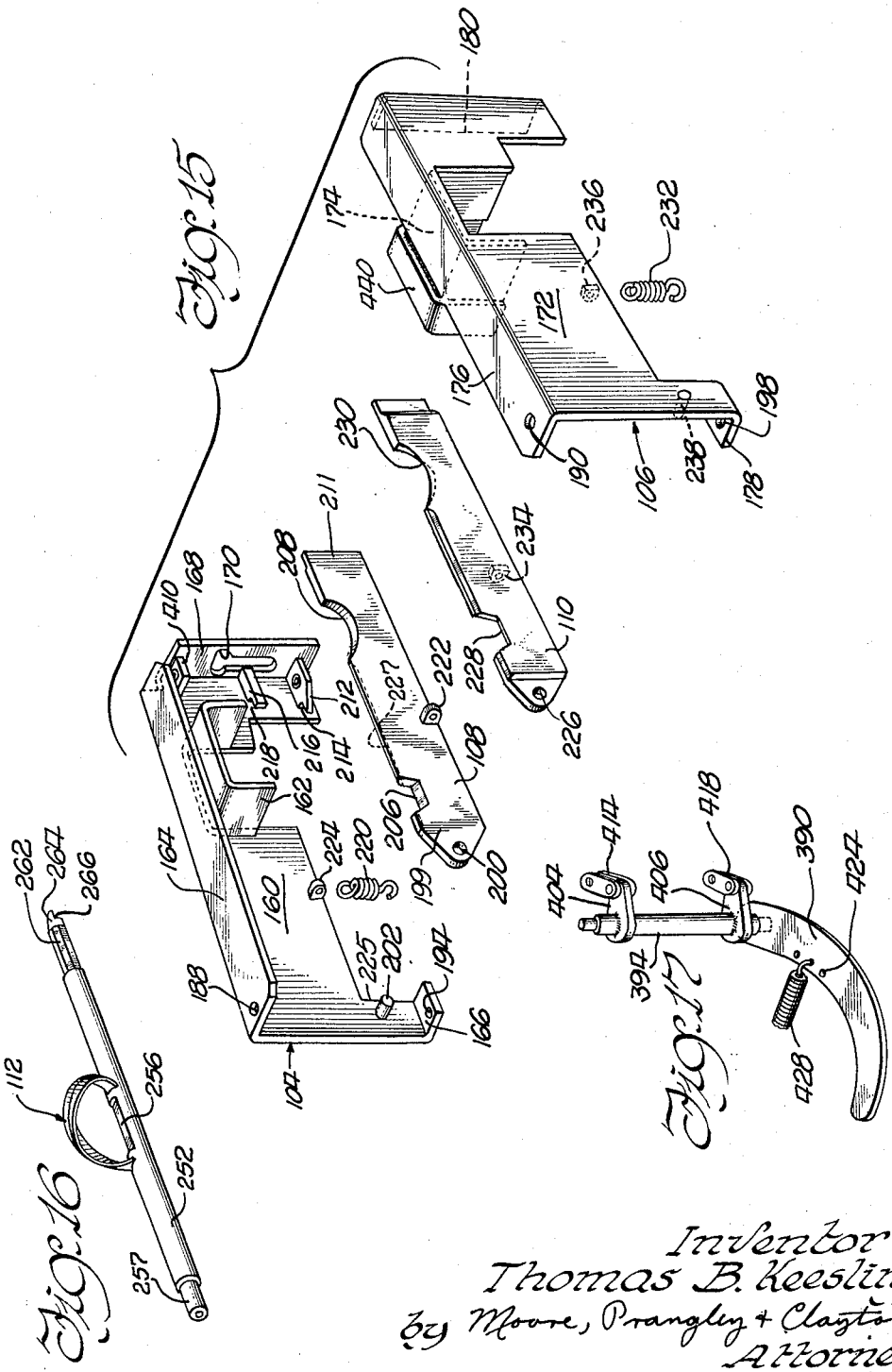

2,962,068

FRUIT PITTING MACHINE

Thomas B. Keesling, Los Gatos, Calif., assignor, by mesne assignments, to Canning Equipment Co., Olympia, Wash., a corporation of Washington Filed Dec. 22, 1954, Ser. No. 476,923

10 Claims. (Cl. 146—28)

The apparatus of the present invention has for its purpose the removal of pits from drupaceous fruits and has particular applicability to the removal of pits from clingstone peaches. Preferably the pitting apparatus is used in combination with other apparatus which is adapted to receive whole fruit arranged in a random manner, thereafter orient the fruit to a predetermined desired position, split the fruit including the pit in a predetermined manner, thereafter remove the split pits from the split fruit and discharge the split and pitted fruit from the machine at one point and discharge the pits at another point. Accordingly, the pitting mechanism has been shown as an integral part of such an apparatus but it is understood that the pitter can be used with other combinations of fruit processing machines and processes.

In apparatus of the type set forth which has been used heretofore various problems have been encountered. More particularly, fruit flesh is unnecessarily removed with the pit such as the so-called "tear outs" at the point at which the knife leaves the fruit in the completion of the pitting operation thereby causing a waste of the desired fruit flesh. The drive mechanism for the pitting knife has been relatively complicated and difficult to synchronize with the movement of the fruit by the continuous conveyor. Another problem encountered is that caused by the uncontrolled discharge of the pit halves after they have been removed from the half fruits. The pit halves sometimes jam the knife structure thereby breaking the knife or some of its driving parts, and in other instances the pit or the broken parts of the knife mechanism are thrown to adjacent operating portions of the machine and cause breaking or jamming of these adjacent portions of the machine. Apparatus of this type also includes means to adjust for varying sizes of peach halves whereby to take greater or smaller cuts by the pitting knife through the fruit flesh depending upon the size of the fruit half. At times the adjusting mechanism is not sufficiently positive and causes improper adjustment of the depth of cut of the pitting knife about the pit halves.

Accordingly, it is an important object of the present invention to provide an improved pitting mechanism or pitter head for use in fruit processing machines of the type set forth.

Another object of the invention is to provide an improved knife structure including an improved knife blade and an improved mounting of the knife blade on the associated drive mechanism.

In connection with the foregoing object it is another object of the invention to provide a simplified drive for pitting knives in pitter heads of the type set forth.

Yet another object of the invention is to provide improved means for adjusting the movement of the pitting knives during the pitting operation in synchronism with the movement of the conveyor carrying the fruit halves to be pitted.

Still another object of the invention is to provide an improved pitter head which controls the disposition and discharge of pits and pit halves after the removal thereof from fruit halves.

Yet another object of the invention is to provide improved means to prevent tear outs of fruit flesh adjacent the pit and particularly at the point at which the pitting knife leaves the fruit flesh during the completion of a pitting stroke of the pitting knife.

A further object of the invention is to provide more positive actuation of the fruit size adjusting mechanism whereby more positively to adjust the depth of the pitting stroke of the pitting knife in accordance with the size of the size of the fruit half to be pitted.

These and other objects and advantages of the invention will be better understood from the following description when taken in conjunction with the accompanying drawings. In the drawings wherein like reference numerals have been utilized to designate like parts throughout:

Figure 1 is a side elevational view with certain parts broken away of a fruit processing machine having incorporated therein the improved pitting mechanism or pitter head of the present invention;

Figure 2 is an enlarged view in side elevation with certain parts broken away of the pitter head of the present invention in combination with its drive mechanism, the pitter head being shown in its position prior to beginning a pitting movement;

Figure 3 is a view similar to Figure 2 showing the pitter head in the position assumed at the end of a pitting movement or operation;

Figure 4 is a top elevational view with certain portions broken away showing the pitter head of Figure 2 in the position of Figure 2;

Figure 5 is an enlarged view in vertical section with certain parts broken away through the pitter head illustrated in Figure 2 of the drawings and substantially as seen in the direction of the arrows along the line 5—5 of Figure 6;

Figure 6 is an enlarged view in horizontal section of the pitter head of Figure 5 substantially as seen in the direction of the arrows along the line 6—6 of Figure 5;

Figure 7 is an end view of the pitter head of Figure 5 substantially as seen in the direction of the arrows along the lines 7—7 of Figure 5;

Figure 8 is a view in vertical section substantially as seen in the direction of the arrows along the line 8—8 of Figure 5 and illustrating the drive mechanism for the pitting knives;

Figure 9 is a view in vertical section substantially as seen in the direction of the arrows along the line 9—9 of Figure 5 illustrating the engagement of the pitting knives with the fruit halves during the pitting operation;

Figure 10 is an enlarged fragmentary view in vertical section illustrating the engagement of a pitting knife with a shear plate as the pitting knife leaves the fruit half at the completion of a pitting operation;

Figure 11 is a fragmentary view substantially as seen in the direction of the arrows along the line 11—11 of Figure 6 and showing a portion of the adjustment for the pitting knife drive which permits exact synchronization between movement of the pitting knives and the movement of the conveyor carrying the fruit halves to be pitted;

Figure 12 is a fragmentary view in vertical section substantially as seen in the direction of the arrows along the line 12—12 of Figure 6 and illustrating the connection between the knife drive and the pitting knife shaft;

Figure 13 is an exploded perspective view showing the construction of the frame for the pitter head of the present invention;

Figure 14 is an exploded perspective view showing the base upon which the pitter head is mounted;

Figure 15 is an exploded perspective view showing the presser plates and the associated shear plates incorporated in the pitter head of the present invention;

Figure 16 is a perspective view of the improved pitting knife blade and shaft therefor of the present invention; and Figure 17 is a perspective view of one of the depth-of-cut position control levers of the present invention and a portion of the mounting therefor.

A machine embodying the present invention includes in general a frame 20, a fruit feeding or supplying mechanism generally designated by the numeral 22, a fruit conveyor 24, a fruit splitting mechanism 26, prime mover means 28 and the pitter head 30. The entire machine is supported upon the frame 20 which includes four upstanding angle iron legs 32 arranged in rectangular form and interconnected by a first pair of angle members 34 and a second pair of angle members 36. There also is provided a third pair of angle members 38 which are attached to legs 32 and support the splitting mechanism 26. Securely fastened to legs 32 positioned to the left in Figure 1 is a sub-frame 40 and a second sub-frame 42 is secured to the right hand pair of legs 32. All of the various portions of the machine are connected to this frame.

Power for operation of the machine is provided by the prime mover 28 which includes a motor 44 and a gear reduction unit (not shown) having an output pulley 46. A pulley 48 is connected directly to the drive shaft of motor 44 and drives a belt 50 which furnishes driving power for the splitting mechanism 26. Pulley 46 on the speed reducer unit cooperates with and drives a chain 52 which drives a pulley 54 connected to the main power shaft 56 of the machine. Shaft 56 also carries a pulley which drives a chain 58 that furnishes the drive for rotation of the pitting knives in the pitter head 30 as will be explained in full hereinafter. Connection is also made from drive shaft 56 to the conveyor 24 whereby conveyor 24 is moved continuously at a fixed and predetermined rate during operation of the machine. Suitable clutch mechanism and safety devices including shear pins are likewise provided but are not specifically illustrated in Figure 1.

The fruit feeding mechanism 22 is also driven from the main shaft 56 and serves to deliver fruit one at a time to conveyor 24. Conveyor 24 carries a plurality of spaced apart fruit receptacles 60 that receives the fruit pieces from feeding mechanism 22 in a random orientation. Each receptacle 60 includes a pair of spaced apart facing fruit cups or holders 62 and 64 (see Figure 6) that are generally conical in shape and are continually urged toward each other by spring means (not shown). Each receptacle 60 receives an unoriented fruit piece at the left hand end of the upper reach of conveyor 24 as viewed in Figure 1 and conveys the fruit to the right during which portion of the travel the fruit is oriented by mechanism (not shown) so that the suture plane of the fruit is aligned in the direction of the travel of the fruit and the stem indent is positioned downwardly. As the receptacles 60 approach the right hand end of the machine, the fruit cups 62 and 64 firmly clamp the fruit piece to carry the fruit piece down to the lower reach of conveyor 24. Along the lower reach of conveyor 24 and toward the right hand end as viewed in Figure 1 the orientation of the fruit is inspected, improperly oriented fruit being detected and removed from the machine and properly oriented fruit being moved to the splitting mechanism 26.

The splitting mechanism 26 includes a shaft 66 rotatably mounted and carrying a pulley 68 driven by the belt 50 described above. Shaft 66 also carries a saw 70 which is rotated at a high speed by the described drive mechanism. Saw 70 serves to split the oriented fruit along its suture plane, both the flesh and the pit of the fruit being cut.

After the fruit has been split by the saw 70, the split halves are moved away by fruit cups 62 and 64, respectively, and the fruit halves are then fed upon the pitter head 30.

Referring now to Figures 2 through 9 of the drawings, the mounting and construction of the pitter head 30 will be described in detail. Support for the pitter head 30 is provided by a plate 72 (see Figure 14 also) which is supported by the posts 32 on a pair of vertically disposed plates 74 and 76. Bolted to plate 72 is a pair of guide channels 78 and 80 having U-shaped slots 82 and 84, respectively, formed on the inwardly facing sides thereof. Each guide channel 78 and 80 is provided with an elongated aperture 85 therein to provide a window for timing the drive mechanism for the knives which will be described hereinafter. Disposed within slots 82 and 84, respectively, is a pair of slides 86 and 88 which are bolted to and carry the pitter head frame 90 and the pitter head cover 92. More specifically, a plurality of bolts 91 and 93 extend through apertures 94 and into tapped holes 96 whereby securely to mount the slides 86 and 88 upon frame 90 and cover 92. In this manner the slides 86 and 88 serve to mount the pitter head frame 90 and all of its attached parts for longitudinal and reciprocating sliding movement with respect to the rigid machine frame 20.

Preferably the slides 86 and 88 are formed of bearing material to insure smooth reciprocation of the pitter head and to increase the wearing life of the moving parts. Part-circular cut-outs 95 and 97 are formed on the lower edges of slides 86 and 88, respectively, to permit viewing of a portion of the drive mechanism for the pitter heads which will be described in full hereinafter. The pitter frame 90 and cover 92 are preferably formed of aluminum thereby reducing the weight and the inertia of the pitter head.

Peach halves are fed to each side of the pitter head 30 from the splitting saw 70. More specifically, one peach half is fed to the left hand side of the pitter head 30 when viewed from the left in Figures 2 through 4 along a series of bars 98 and to the right hand side along a series of bars 100 and 102. The free ends of the bars 98, 100 and 102 are adapted to fit in part-circular grooves formed in the sides of pitter frame 90 and cover 92. More specifically, a pair of upper grooves 101 are provided to receive the ends of upper bars 98 and 100 and a pair of lower grooves 103 to receive the free ends of the lower bars 98 and 102. As may be best seen in Figure 2, the bars 98, 100 and 102 extend over the pitter frame 90 and cover 92 a substantial distance when the pitter head is in position to receive peach halves and after the pitter head has moved to the left or pitting position as illustrated in Figure 3, the ends of the bars 98, 100 and 102 are positioned adjacent the right hand end of cover 92 as viewed in Figure 3.

After leaving the ends of bars 98, 100 and 102 the peach halves pass onto a pair of presser plates generally designated by the numerals 104 and 106 which are pivotally mounted upon frame 90. Also pivotally mounted upon the presser plates 104 and 106 and engaging the cut faces of the peach halves are shear plates 108 and 110, respectively. Pitting apertures which will be explained more fully hereinafter are provided in the presser and shear plates and a left hand knife 112 is provided to remove the pits from the peach half positioned against the left hand plates and a similar right hand knife 114 is provided on the right hand side of the pitter head.

From Figure 13 it will be seen that frame 90 has a portion 116 at one end which is hollow and provided with walls on the sides and top, the grooves 101 and 103 being provided in portion 116. Extending from portion 116 and substantially perpendicular to wall 118 thereof is a web 120 which extends to the forward end of the pitting head. Also extending from wall 118 and disposed perpendicular to web 120 is a pair of webs 122 and 124 which extend on each side of web 120 for substantially the length thereof. Web 120 is positioned substantially in the center of wall 118 and webs 122 and 124 are positioned below the upper edge of web 120. A pair of wings 126 and 128 extend outwardly from webs 122 and 124, respectively. A similar pair of wings 130 and 132 extends outwardly from web 120 and parallel to wings 126 and 128. Suitable apertures 134, 136, 138 and 140 are provided in wings 126, 128, 130 and 132, respectively, to receive shafts that support the presser plates 104 and 106 as will be described more fully hereinafter. Recesses 142 are formed in web 120 beneath wings 126 and 128 to provide places for mounting blocks 144 and 146 which provide bearings for the forward ends of the knife shafts. Blocks 144 and 146 are mounted on web 120 by a bolt 148 and nut 150, bolt 148 passing through aligned apertures therein.

The forward lower end of web 120 is provided with a pair of outwardly extending enlargements or bosses 152 and 154 which carry the tapped holes 96 described above. A reinforcing web 156 interconnects wing 130 and boss 152 and a similar web 158 interconnects wing 132 and boss 154.

Referring to Figure 15, it will be seen that presser plate 104 includes a main plate 160 which is generally rectangular in shape and has apertures formed therein to provide pitting apertures and a place for the shear plate 108. Preferably the pitting aperture, i.e., the portion of the aperture adjacent the cutting blade of the knife, is formed rectangular and a generally U-shaped shield 162 is attached to plate 160 around the pitting aperture therein. The upper longitudinal edge of plate 160 has a flange 164 formed integral therewith and extending substantially the length thereof. The opposed edge of plate 160 has a short flange 166 formed thereon extending in the same direction as flange 164 and substantially parallel therewith. Another flange 168 is formed on one vertical edge of plate 160 and has an aperture 170 formed therein through which passes the shaft of the associated pitting knife.

Pitting plate 106 is shaped similar to pitting plate 104 and includes a main plate 172, a shield 174 around three sides of the rectangular pitting aperture, and flanges 176, 178 and 180. An aperture 182 is provided in flange 180 to accommodate the associated knife shaft.

The presser plates 104 and 106 are pivotally attached to the forward end of pitter frame 90 by means of pins 184 and 186, respectively, extending through apertures 188 and 190, respectively, into apertures 134 and 136, respectively (see Figures 6 and 7 also). A pin 192 also extends through an aperture 194 in flange 166 and upwardly into aperture 138 to form a second aligned pivot for presser plate 104 and a similar pin 196 extends upwardly through an aperture 198 in flange 178 into the aperture 140 in frame 90.

The construction and mounting of shear plate 108 can be best seen in Figures 5 and 15. More specifically, shear plate 108 is substantially rectangular in shape and is provided at one end with a portion 199 of reduced thickness having an aperture 200 therein which receives a pin 202 on presser plate 104. A cotter key 204 retains the shear plate 108 on pin 202. A first notch 206 is formed near pivot 200 and a second part-circular notch 208 is formed adjacent the other end of shear plate 108. One surface 210 of notch 208 is bevelled on the inwardly directed side to cooperate with the cutting edge of knife 112 as will be explained more fully hereinafter (see Figure 6 also). The end 211 of plate 108 opposite pivot pin 202 has a reduced thickness and is adapted to move upwardly and downwardly and is restrained in a direction perpendicular to the surface of plate 160 by a lower plate 212 having a notch 214 formed therein and an upper plate 216 having another notch 218 formed therein.

A spring 220 is connected at one end to a boss 222 on shear plate 108 and at the other end to a boss 224 on plate 160. Spring 220 serves to hold shear plate 108 in the upper position, shear plate 108 being free to move downwardly when urged by knife 112 against the action of spring 220 while pivoting about pin 202.

As is best seen in Figure 9, the outwardly disposed face of the shear plate 108 is in alignment with the outer edge of presser plate 104 whereby to form a smooth continuous support for the cut face of the fruit half engaged thereon. The juncture between reduced portion 199 and the main portion of shear plate 108 and the juncture between reduced portion 211 and the main body of shear plate 108 are bevelled to provide a smooth path for movement of the cut face of the engaged fruit half. For the same reason the edge 225 of presser plate 104 is bevelled on the outer surface thereby insuring smooth passage of the fruit thereacross without injury to the fruit. The part of the shear plate between notches 206 and 208 is relieved and bevelled on the outwardly directed side (see Figure 5) as at 227 and is spaced away from the adjacent edge of presser plate 104.

Shear plate 110 is constructed as the mirror image of shear plate 108 and includes an aperture 226, a first bevelled notch 228 and a second part-circular bevelled notch 230. The free end of plate 110 is restrained by a pair of notched plates mounted on presser plate 106 and similar in shape and function to plates 212 and 216 on presser plate 104. A spring 232 is interconnected between a boss 234 formed on shear plate 110 and a boss 236 formed on presser plate 106 whereby to urge shear plate 110 upwardly about point 226 into engagement with knife 114. A pivot pin 238 is formed on plate 172 and extends through aperture 226, shear plate 110 being held thereon by a cotter pin 240 (see Figure 7 also).

The construction and operation of knives 112 and 114 will now be described. Each of the knife blades 112 and 114 is helicoidal in shape and presents a substantially semi-circular edge when viewed from the side as in Figure 5. The shape of the cutting edge can be best seen in Figures 9 and 10 wherein the knife is shown cutting a pit from a half fruit. The half fruit is generally designated by the numeral 242 and includes the edible fleshy part 244 and the pit or stone 246. The surface of the knife adjacent the cutting edge is bevelled as at 248 on the side facing the flesh and a slight bevel is made on the edge thereof as at 250 on the side facing the pit 246. The slight bevel on surface 250 aids in guiding the blades about the pit 246 and the heavy bevel at 248 aids in throwing the pits away from the flesh 244 and out of the way of the moving parts of the machine.

The knife blades 112 and 114 are mounted upon knife shafts 252 and 254, respectively. The knife shafts are substantially cylindrical throughout their entire length but are provided with flattened portions 256 and 258, respectively, at the point opposite the pitting apertures in the presser plates (see Figure 6). The flattened portions 256 and 258 have a length slightly less than the extent of the associated knife blade and the edges defining the flattened portions are bevelled upwardly. The depth of the flattened portions at the point of greatest extent is preferably approximately one-quarter of the diameter of the associated knife shaft. The knife blades are attached to the knife shafts by forming slots in the shafts extending in a direction substantially perpendicular to the axis of the shafts, inserting the ends of the knife blades into the slots, and brazing the knife blades to the knife shafts. The ends of the knife blades at the point of entry into the associated knife shaft are displaced approximately 90° circumferentially with respect to the associated knife shaft from each other and at an angle of approximately 45° circumferentially with respect to the plane surface of the flattened portion on the knife shaft. The forwardly disposed ends 257 and 259 of the knife shafts are reduced in diameter and are received within bearing openings formed in bearing blocks 144 and 146, respectively. Preferably bearing blocks 144 and 146 are formed of Phosphor bronze or some similar good bearing material. These ends of the shafts are also preferably fitted with grease connections 260, see Figures 5 and 7.

The other or rearward ends of the knife shafts are shaped hexagonally as at 262 on knife shaft 252 (see Figure 12). The outermost end is also bevelled at 264 and is provided with a notch 266 to serve as a positioning indicator. The hexagonal portion 262 is received within a complementarily shaped elongated aperture in the sleeve 268 of a sleeve mitre gear generally designated by the numeral 270. Suitable gear teeth 272 are formed on the gear 270 and a plug 274 having a notch 276 is positioned in a cylindrical opening in one end of the sleeve 268, the opening having a diameter equal to that of the knife shaft 252. Notch 276 cooperates with notch 266 on the knife shaft whereby to obtain proper positioning of the knife shaft with respect to its driving mechanism. A pin 277 extends through aligned apertures in gear sleeve 268 and knife shaft 252 to interconnect these two parts. Aligned lubricating apertures are formed through plug 274 and the entire length of knife shaft 252. Sleeve 268 is received by a Phosphor bronze bushing 278, one end of which is received in wall 118 of the pitter frame 90 and the other end of which is received in an aperture in a projection 280 formed integral on pitter frame 90 and spaced from wall 118.

Knife shaft 254 is similarly equipped with a mitre gear 282 positioned in a bushing 284 supported by a projection 286 (see Figures 5 and 6).

In order to obtain proper pitting of the peach halves, it is necessary that the pitting knives be positioned as illustrated in Figure 2 when the pitting head is to the right or rearward position as illustrated in Figure 2 and that the knives thereafter be rotated 360° and in opposite directions while the pitter head travels to the position illustrated in Figure 3. Thereafter the knives preferably remain stationary until the pitting head has moved back to the position illustrated in Figure 2. To this end an improved drive mechanism for the pitter knives has been provided.

The driving power for the pitter knives is ultimately derived from the drive motor 28 through chain 58 which passes around and drives a gear 288 which is supported upon and drives a shaft 290. Shaft 290 is rotatably mounted as by a block 289 fastened to the lower side of rail 78 by a pair of bolts 291 (see Figures 8 and 11), block 289 having an aperture 293 therein to receive one end of shaft 290. Also mounted upon shaft 290 is a second sprocket gear 292 (see Figure 5). Gear 292 engages and drives a chain 294 which extends over and around a wheel 296 which is supported upon a shaft 298. Shaft 298 is received in a U-shaped slot 299 formed in the upper surface of an adjustment plate 300 which is adjustably mounted upon the underside of plate 72 (see Figures 5 and 14). A threaded stud 302 is formed integral with one side of plate 300 and extends into an aperture 304 in flange 306 of plate 72. A nut 308 threadedly engages stud 302 whereby to position and adjust shaft 298 with respect to shaft 290 whereby to loosen and tighten chain 294 as desired. It will be seen that wheel 296 extends upwardly through an aperture 310 in plate 72 so that the upper reach of chain 294 travels above plate 72. In order to maintain at all times the vertical position of the upper reach of chain 294, track 312 is bolted to plate 72 by means of screws 314 whereby to support the upper reach of chain 294 during its operation.

The direction of movement of chain 58 is such as to drive gears 288 and 292 in a clockwise direction as viewed in Figure 5 whereby to cause the upper reach of chain 294 to travel from left to right as viewed in Figure 5. This portion of chain 294 engages a gear 316 (see also Figure 8) mounted upon a shaft 318 received in bearings formed on frame 90 and frame head 92. Secured to gear 316 is a second gear 320 which turns with gear 316 in a counterclockwise direction as viewed in Figure 5 when there is relative movement between shaft 318 and chain 294 and in turn drives a gear 322 in a clockwise direction. Gear 322 is supported upon a shaft 324 which is received in a pair of apertured embossments 326 in head 92 and in mating grooves in frame 90 and head 92. When shafts 318 and 324 and their associated parts are in assembled position, a plurality of bolts 328 firmly hold head 92 assembled against frame 90.

Secured to gear 322 are two mitre gears 330 and 332 which face in opposite directions and mesh with gears 282 and 272, respectively. Rotation of gear 322 in a clockwise direction as viewed in Figure 5 serves to drive knife shaft 252 in a clockwise direction as viewed in Figure 8 and to drive knife shaft 254 in a counterclockwise direction as viewed in Figure 8.

Referring now to Figures 2, 3 and 5 the manner in which the above described mechanism provides the desired movement of the knives 112 and 114 will be explained. Upper reach of chain 294 moves continuously to the right by being driven by gear 292. When gear 316 is stationary, the knife shafts are stationary but upon rotation of the gear 316, the knife shafts are rotated. Movement of the pitter head to the left from the position shown in Figure 2 toward that shown in Figure 3 causes relative movement between the upper reach of chain 294 and gear 316 whereby to move gear 316 in a counterclockwise direction. Movement of gear 316 in a counterclockwise direction drives gear 322 in a clockwise direction thereby causing the desired rotation of knife shafts 252 and 254. So long as there is relative movement between the upper reach of chain 294 and gear 316 the knife shafts will be rotated.

During the reverse travel of the pitter head, that is, while it is moving from the position illustrated in Figure 3 to that shown in Figure 2, there will be no relative movement between gear 316 and the upper reach of chain 294 since the movement of pitter head 30 is adjusted so that it is equal to the movement of the upper reach of chain 294. As a result, the gear 316 is not rotated and the pitter knife shafts 252 and 254 also remain stationary with the knives 112 and 114 positioned as shown in Figures 2, 3 and 5. The length of time that chain 294 drives gear 316 is such that the knife shafts 252 and 254 are rotated 360° in one direction during travel of the pitter head to the left as viewed in Figures 2, 3 and 5. During the return movement of the pitter head the knives are held stationary and upon a second movement of the pitter head to the left the knives are again rotated 360° in the same direction that they were first rotated.

In order to obtain proper positioning of the knife blades 112 and 114 at the beginning and end of a pitting operation, it is necessary to provide an adjustment between the drive derived from chain 58 and the remaining drive to the pitter knives. Referring now to Figures 6 and 11 of the drawings, such an adjustment is shown. There is secured to shaft 290 by means of a key an adjusting collar 334. Collar 334 is provided with a part-circular portion 336 providing a shoulder 338 and the sprocket 288 is provided with a part-circular portion 340 providing an opposed shoulder 342. Gear 288 is also provided with a pair of elongated slots 343 and 344 through which extend bolts 346 and 348 that mate with threaded apertures in adjusting collar 334. Part-circular portion 340 also has a pair of threaded apertures 350 extending therein in a direction parallel to the surface of gear 288 and perpendicularly to the axis of shaft 290. These apertures extend entirely through portion 340 and receive a pair of set screws 352. The ends of set screws 352 are adapted to bear against shoulder 338 of part-circular portion 336 attached to adjusting collar 334. In order to adjust the relative position between shaft 290 and gear 288, the bolts 346 and 348 are first loosened and then one of the set screws 352 is threaded one direction and the other set screw 352 is threaded the other direction to obtain the desired angular relationship between the opposing shoulders 338 and 342. This in turn adjusts the angularity between gear 288 and shaft 290 whereby to adjust the time of the rotation of the knives 112 and 114. Thereafter the bolts 346 and 348 are tightened which completes the adjustment.

The manner in which the horizontal reciprocation of pitter head 30 is obtained will now be explained in detail. Referring first to Figure 1 of the drawings, there is shown a lever arm 354 which is pivotally mounted on the main machine frame as at point 356 and has a cam follower 358 at the upper end thereof which engages a drive on main cam shaft 56. The lower end of lever arm 354 is fixedly attached to a shaft 360 as may be best seen in Figures 2 through 6. Shaft 360 is moved in an arcuate manner in accordance with the portion of the cam engaged by cam follower 358. Also affixed to shaft 360 is a pair of arms 362, one arm 362 being disposed on one side of the pitter head and the other arm 362 on the other side of the pitter head (see Figures 6 and 7). The major axes of arms 362 are substantially aligned with the major axis of lever arm 354 so that motion of lever arm 354 is transmitted through shaft 360 directly to arms 362. The free end of each arm 362 is apertured and has attached thereto a link 364 having an integral stud 366 extending therethrough. A cotter pin 368 serves to hold the link 364 in engagement with its associated arm 362. The other end of each link 364 is provided with an aperture having a bushing 370 therearound through which extends a shaft 372. In addition to extending through links 364, shaft 372 extends through aligned apertures 374 in frame portions 152—154 (see Figure 13) and through apertures 376 and 378 in slides 86 and 88, respectively. One end of shaft 372 carries an enlarged knurled portion 382 and the other end is apertured and receives a cotter pin 384 which serves to hold the parts in assembled relationship. The other end of shaft 360 is also provided with a supporting link 386 which is pivoted to the main frame at a point in alignment with pivot point 356 (see Figure 1).

By properly shaping the cam mounted on shaft 56 the above described linkage will give the desired reciprocation of pitter head 30 in timed relationship with the other operating portions of the machine. The cam is likewise shaped so that proper cooperation is had between chain 294 and the remaining portion of the pitter knife drive (see Figure 5) so that the pitter knives 112 and 114 are held in the upright position as shown in Figure 5 at the beginning and at the end of a pitting operation, turned through a full 360° while the pitter head travels from the position shown in Figure 2 to that shown in Figure 3, and thereafter remain stationary while the pitter head returns to the position shown in Figure 2.

As has been pointed out heretofore, the presser plates 104 and 106 are pivotally adjustable whereby to position the half pit and its associated presser plate in accordance with the size of the half fruit. More particularly, it is desirable that the half fruit and its associated presser plate be positioned nearer the knife shaft for larger fruit and positioned farther away from the shaft for smaller fruit. The amount of shifting of the presser plates must be controlled in order to limit the distance that the presser plates move inwardly and thereby to insure that the precise depth of cut necessary is made. This eliminates unnecessary waste of the desired fruit flesh occasioned by leaving large amounts thereof attached to the removed pit half.

To this end a self-adjusting and limiting mechanism has been provided which is similar in principle, construction and operation to that disclosed in the prior application referred to above. More particularly, there have been provided two fruit sizing levers 388 and 390 (see Figure 6) for presser plates 104 and 106, respectively. The levers 388 and 390 are fixedly attached to a pair of shafts 392 and 394 respectively, the upper end of shaft 392 being journaled in an aperture 396 in frame 90 (see Figure 13) and the upper end of shaft 394 being journaled in a similar aperture 398. The lower end of shaft 392 is journaled in a "Dural" bearing block 400 attached to web 120 and the lower end of shaft 394 is similarly mounted in "Dural" block 402 fastened also to web 120. Also fixedly attached to each shaft 392 and 394 is an upper arm 404 (see Figures 9 and 17 also) and a lower arm 406 which extend outwardly and substantially perpendicular to the axis of shaft 394. The outer end of upper arm 404 on shaft 392 is pivotally connected to a pair of chain links 408 which are in turn pivotally attached at their other ends to a flange 410 fixedly attached adjacent the upper end of presser plate 104. Another set of chain links 412 is attached to the outer end of lower arm 406 on shaft 392 and are pivotally connected to plate 212. By the above described linkage, movement of arm 388 causes movement of presser plate 104 and vice versa.

The upper arm 404 on shaft 394 is also connected by a pair of chain links 414 to a flange 416 formed on presser plate 106. The outer end of arm 406 on shaft 394 is similarly connected by links 418 to a plate 420 attached to the lower edge of presser plate 106.

Referring again to Figure 6, it will be seen that each of the levers 388 and 390 is curved with the free end thereof disposed toward the left hand or forward end of the machine. A plurality of apertures 422 is formed in lever 388 and a similar set of apertures 424 is formed in lever 390. One end of a spring 426 is connected in one of the apertures 422 and at the other end to pin 138 attached to wing 130 (see Figure 13) on the pitter frame 90 whereby continuously to urge lever 388 in a direction to position presser plate 104 in the outermost position, that is spaced farthest away from the axis of knife shaft 252. A spring 428 has one end connected in an aperture 424 and the other end attached to pin 196 and serves to move lever 390 to a position such that presser plate 106 is positioned farthest away from the axis of knife shaft 254. A pin 430 mounted on frame wall 118 limits the outermost movement of presser plate 104 and a similar pin 432 limits the outermost movement of presser plate 106.

Before the beginning of a pitting operation, the presser plates 104 and 106 are positioned outwardly in the farthermost position. Movement of peach halves from the pitter head 90 onto the presser plates tends to move the presser plates inwardly toward the center of the pitter head, the presser plates pivoting about pins 184 and 186. The fruit conveying cups 62 and 64 are pressed inwardly by spring means (not shown) and carry with them rollers 434 and 436, respectively. The spring means urging the cups 62 and 64 toward the presser plates moves the presser plates inwardly toward the associated knife shaft and this causes the levers 388 and 390 to pivot outwardly about their shafts 392 and 394 respectively due to the interconnection with the presser plates. The presser plates move inwardly and the levers 388 and 390 pivot outwardly until the outer edge of the levers contact the rollers 434 and 436, respectively. Contact with the rollers stops movement of levers 388 and 390 and stops the inward movement of presser plates 104 and 106. After the pitting operation the cups 62 and 64 drop away whereby to discharge the pitted fruit halves.

A typical cycle of operation of the pitter head of the present invention will now be described. A peach is split into two substantially identical halves by the saw 70 and the peach halves are fed along the spreading rods to the pitter head. One peach half is fed along rods 98 to the left hand side of the pitter head as viewed from the left in Figure 2. The other peach half is fed along bars 100 and 102 to the other or righ hand side of the pitter head. During this feeding motion, the pitter head is returning from the position illustrated in Figure 2 of the drawings to that shown in Figure 3 and thereafter the fruit halves held by the cups 62 and 64 are fed upon the presser plates 104 and 106. As the pitter head 30 begins to move to the left from the position illustrated in Figure 2, the pit of each fruit half is brought into registration with the pitting aperture in the associated presser plate and in alignment with knife 112 or 114.

In moving upon the presser plates 104 and 106 the spring pressure urging the cups 62 and 64 inwardly also pivot the presser plates 104 and 106 about points 184 and 186 until the self-compensating mechanism including arms 388 and 390 is brought into equilibrium. The final position of the presser plates 104 and 106 is dependent upon the size of the fruit half pressed thereagainst since the presser plates move inwardly until arms 388 and 390 are on the rollers 434 and 436. At this time the link mechanism including shafts 392 and 394, arms 404 and the double links 408 and 414 (see Figure 6) stop the inward movement of the presser plates. The peach halves now are mounted in position such that the associated knife blades will make a cut of the desired depth through the fruit flesh about the pit.

Proper alignment of the fruit halves with respect to the knife blades 112 and 114 is further assured by the fact that the outwardly disposed face of the shear plates 108 and 110 are in alignment with the outwardly disposed face of the presser plates so that the cut face of each fruit half is supported by a substantially continuous plane composed partly of the associated presser plate and partly of the associated shear plate.

After proper positioning of the peach halves as described above, the pitter head 30 has been moved slightly to the left from the position shown in Figure 2 and the drive mechanism including chain 294 and gears 316, 320, 322, 272 and 282 begin rotation of the pitting knives. The knife 112 is rotated in a clockwise direction as viewed from the rear or right hand end as seen in Figure 6 of the drawings. Knife 114 is rotated in a counterclockwise direction when viewed from the rear end of the pitter head 30. The knives are so shaped that the forward or left hand ends thereof as viewed in Figure 6 first enter the flesh of the fruit halves and enter at a point above the associated knife shafts 252 and 254. Continued movement of the pitter head 30 to the left from the position shown in Figure 2 to that shown in Figure 3 causes continued rotation of the knives 112 and 114, the cut of the pitting knives progressing from the top downwardly and from the front or left hand end as viewed in Figure 6 to the lower or right hand end.

As is diagrammatically illustrated in Figure 10 of the drawings, the bevelled edge 248 on the knives pass into the flesh and the forward or left hand portion of bevelled edge 248 quickly contacts the bevelled edge 230 on the associated shear plate. More specifically, point 439 on shear plate 104 (see Figure 5) engages bevel 248 on the associated knife blade just behind the cutting edge thereof. The associated shear plate 108 or 110 is pushed downwardly by the associated knife blade in an amount dependent upon the distance that the presser plates have been moved inwardly due to the fruit size. Since each shear plate is spring urged upwardly toward the associated pitting knife, edge 208 or 230 of the shear plate, as the case may be, is held in constant shear relationship with the cutting edge of the associated pitting knife. Continuous adjustment of the shear plate with respect to the pitting knife is provided since the pitting knife in effect drives or moves the shear plate to the optimum shear position. The adjustment of the shear plate is effected by a substantially single point contact between the shear edge of the associated shear plate and a point spaced behind the cutting edge of the knife blade on bevel portion 248. This point of contact progresses from the forward point 439 on the shear edge toward the rear of the shear edge, the distance traveled depending upon the position of the presser plate with respect to the associated knife shaft.

The bevelled edge 250 on the knife blades tends to force the pits inwardly toward the center of pitter head 30 and since the rear ends (the right hand end as viewed in Figure 6) of the pitting blades are the last to complete the cut about the pit, the pit halves are thrown inwardly and downwardly by the action of the pitting knives. To insure that the pit halves are thrown downwardly, the shields 162 and 174 about the pitting apertures in presser plate 160 and 162 have been provided. Since provision must be made for moving the presser plates toward and away from each other an overlapping U-shaped shield 440 is integrally attached as by welding to shield 174. Shield 440 is larger than shield 162 whereby to overlap and fit over shield 162 when the presser plates are moved toward each other as viewed in Figures 7 and 9. By this means the path of movement of the pit halves when they are ejected from the fruit halves is restrained so that the pits drop inwardly and downwardly away from the other operating portions of the pitting mechanism and the associated machine. This prevents the pit halves from jamming or breaking portions of the pitter head or the associated parts of the fruit machine. The flattened portions 256 and 258 on the knife shafts 252 and 254 also aid in preventing jamming of the pits about the pitting knives and the other pitting mechanism by permitting ready discharge of the removed pit halves.

At the end of a pitting movement of the pitter head 30, the knives have been rotated through 360° to an upstanding position as is illustrated in Figure 3 of the drawings. At this time the pit halves have been discharged and the fruit flesh has been moved on and discharged. During the return movement of the pitter head from the position shown in Figure 3 to the position shown in Figure 2, the knives are held stationary because there is no relative movement between chain 294 and gear 316. More specifically, the pitter head 30 is moving at the same speed and in the same direction as the upper reach of chain 294. In this manner the knives are held in poised position ready for the next pitting cycle during the return movement of the pitter head and while another set of fruit halves is being moved into operative position over the pitting apertures in presser plates 104 and 106. It will be seen that the drive mechanism is relatively simple and gives positive rotation of the pitting knives through 360° rotation to effect a pitting operation and thereafter holds the pitting knives in a stationary ready position while the pitter head is returned to a position such that a subsequent pitting operation can be begun. Thereafter the pitting knives are turned 360° in the same direction as before (but opposite to each other as explained above) to effect the next pitting operation.

It will be seen that there has been provided a pitter head and parts therefor which fulfill all of the objects and possess all of the advantages set forth herein. Although a preferred form of the invention has been shown for purposes of illustration, it is to be understood that various changes and modifications can be made therein without departing from the spirit and scope of the invention. Accordingly, the invention is to be limited only as set forth in the following claims.

I claim:

1. In a fruit pitting machine including a machine frame, means on the frame for feeding a fruit half at a continuous uniform rate along a predetermined path, a reciprocating pitter unit mounted on the frame for to and fro movement parallel to said path, means operatively associated with said pitter unit for moving said pitter unit in synchronism with said feeding means during a predetermined portion of the cycle of reciprocation of said pitter unit, said pitter unit including a reciprocating support and a rotatable pitter knife mounted for movement with said support, a driving member mounted on the frame, means for moving said driving member at a continuous uniform rate in one direction and a driven member carried by said reciprocating support in driving engagement with said driving member and operatively connected to said pitter knife for rotating said pitter knife to pit a fruit half during forward movement of said pitter unit and holding said pitter knife against rotation during rearward movement of said pitter unit.

2. In a fruit pitting machine including a machine frame, a conveyor on the frame to move a pair of fruit halves continuously at a constant rate, a reciprocating pitter unit on the frame and comprising a pair of rotatably mounted pitting knives to engage and pit fruit halves conveyed by said conveyor, drive mechanisms operatively associated with said pitter unit for moving said pitter unit in synchronism with said conveyor during a predetermined portion of the cycle of reciprocation of said pitter head, a driving member mounted on the frame for movement at a continuous uniform rate in one direction, and a driven member carried by the pitter head and operatively connected to said pair of pitting knives for rotating said pitting knives to pit the fruit halves during movement of the pitter head in the same direction as the conveyor and holding said pitting knives against rotation during the opposite movement of said pitter head.

3. In a fruit pitting machine including a machine frame, a conveyor on the frame to move fruit continuously at a constant rate, a reciprocating pitting unit mounted on the frame and comprising a rotatably mounted pitting knife to engage and pit fruit conveyed by said conveyor, drive mechanism to reciprocate said pitting unit to and fro at the same speed as said conveyor during a predetermined portion of the cycle of reciprocation of said pitting unit, a drive member mounted on the frame adjacent said conveyor and moved in a direction opposite to said conveyor, and driven mechanism carried by the pitting unit and operatively interconnecting said drive member and said pitting knife, said driven mechanism being operable to rotate said pitting knife a full revolution to perform a piting operation while the pitting unit is moving in the same direction as said conveyor and in a direction opposite to said drive member, said driven mechanism being operative when said pitting unit is moving in a direction opposite to that of said conveyor and in the same direction as said drive member to hold said pitting knife against rotation.

4. In a fruit pitting machine including a machine frame, a conveyor on the frame to move fruit continuously at a constant rate, a reciprocating pitter unit mounted on the frame and comprising a rotatably mounted pitting knife to engage and pit fruit conveyed by said conveyor, drive mechanism to reciprocate said pitter unit to and fro at the same speed as said conveyor and in the same direction as said conveyor during a predetermined portion of the cycle of reciprocation of said pitter unit, a driving chain mounted on the frame for movement adjacent said conveyor and having a reach thereof moving parallel to and in a direction opposite to said conveyor, and gear mechanism carried by said pitter unit and operatively interconnecting said chain and said pitting knife, the relative movement between said gear mechanism and said chain when said pitter unit is moving in the same direction as said conveyor causing said pitting knife to rotate a full revolution to perform a pitting operation, the speed of said pitter unit when moving in a direction opposite to that of said conveyor and the speed of said reach of said chain being equal whereby said pitting knife is held against rotation while the pitter unit is moving in a direction opposite to said conveyor.

5. In a fruit pitting machine including a machine frame, a conveyor on the frame to move a pair of fruit halves continuously at a constant rate, a reciprocating pitter unit mounted on the frame and comprising a pair of rotatably mounted pitting knives to engage and pit fruit halves conveyed by said conveyor, said pitting knives having helicoidal cutting edges curved oppositely to each other, means for reciprocating said pitter unit to and fro at the same speed as said conveyor during a predetermined portion of the cycle of reciprocation of said pitter unit, and drive mechanism including a driving member mounted on the frame for movement at a continuous uniform rate in one direction and a driven member carried by the pitter unit and operatively connected to the pitting knives to drive said pitting knives in synchronism in opposite directions and operable to rotate each pitting knife a full revolution to perform a pitting operation while the pitter unit is moving in the same direction as said conveyor and operable to hold each pitting knife against rotation while the pitter unit is moving in a direction opposite to that of said conveyor, each of said pitting knives being rotated by said drive mechanism in a direction to cause the end of its cutting edge disposed forwardly in the direction of travel of the pitter unit to enter the associated fruit half first and the initial point of contact of the cutting edge with the fruit half to move progressively in a direction opposite to the direction of travel of the pitter unit to effect pitting of the fruit half.

6. In a fruit pitting machine including a machine frame, a pitter unit comprising a reciprocating support mounted on the frame, a pitting knife blade rotatably mounted on said support, a presser plate shiftably mounted on said support for movement toward and from the axis of the knife blade and having a pitting aperture through which said blade rotates to pit a half fruit in engagement with said presser plate, a shear plate pivotally mounted on said presser plate for movement with the presser plate toward and from the axis of the knife blade and for swinging movement in the plane of said presser plate, said shear plate having a shear edge forming a part of the edge of the pitting aperture through which said knife rotates, and spring means interconnecting said shear plate and said presser plate for maintaining the shear edge of said shear plate in contact with said knife as it emerges from a fruit half and swings the shear plate relative to the presser plate against the action of said spring means.

7. In a fruit pitting machine, a rectilinearly reciprocating pitter head comprising a reciprocating support, a pitting knife blade rotatably mounted on said support, said pitting knife blade being helicoidal in shape and having a helicoidal cutting edge, said blade also having inner and outer faces and a bevel surface on the outer face thereof adjacent said cutting edge, a presser plate shiftably mounted on said support for movement toward and from the knife axis and having a pitting aperture through which the knife blade rotates to pit a fruit half in engagement with said presser plate, a shear plate pivotally mounted on said presser plate for movement in the plane of said presser plate and having a bevelled part-circular shear edge forming an edge portion of the pitting aperture in the presser plate, spring means interconnecting said shear plate and said presser plate for resiliently urging said shear plate relative to said presser plate toward said knife blade as it rotates to position the bevelled shear edge to contact the bevel surface of said knife blade behind said cutting edge at a point progressively moving from one end of the blade to the other as the cutting edge of the blade emerges from the fruit half during the pitting operation.

8. In a fruit pitting machine including a conveyor to move fruit continuously at a constant rate, a reciprocating pitter head comprising a reciprocating support operatively associated with said conveyor, a pitting knife rotatably mounted on said support, said pitting knife being helicoidal in shape and having a helicoidal cutting edge, said knife having an outer face with a bevel surface adjacent said cutting edge, a presser plate shiftably mounted on said support for movement toward and from the knife axis and having a pitting aperture through which said knife rotates to pit a fruit half in engagement with said presser plate, a shear plate pivotally mounted on said presser plate for movement in the plane of said presser plate and for movement with said presser plate toward and from the knife axis, said shear plate having a bevelled shear edge forming an edge portion of the pitting aperture, the shear edge of said shear plate contacting the bevel surface of said knife behind the cutting edge thereof at a point progressively moving from one end of the knife to the other as the pitting operation proceeds, means for resiliently urging said shear plate toward said knife and into shear engagement therewith, and drive mechanism operatively connected to said pitting knife and operatively associated with said conveyor for rotating said pitting knife a full revolution to perform a pitting operation while the pitter support is moving in the same direction as said conveyor and for holding said pitting knife against rotation while said support is moving in a direction opposite to that of said conveyor.

9. In a fruit pitting machine including a conveyor to move fruit continuously at a constant rate, a reciprocating pitter unit comprising a reciprocating support operatively associated with said conveyor, a pitting knife mounted on said support for rotation about an axis fixed relative to said support, a presser plate shiftably mounted on said support for movement from a fruit receiving position toward the axis of said knife, said presser plate having a pitting aperture through which said knife rotates to pit a fruit half in engagement with said plate, a fruit holder mounted on said conveyor for movement relative to the conveyor toward the presser plate and the axis of the pitting knife, means operatively associated with the conveyor for moving said fruit holder relative to the conveyor toward the presser plate to position the fruit half in the holder in engagement with said presser plate and thereafter move the presser plate toward the axis of the pitting knife, stop means carried by the fruit holder, means shiftably mounted on said support and operatively connected to said presser plate for shifting movement in response to said presser plate to engage said stop means thereby to limit the movement of the presser plate in accordance with the size of the half fruit to be pitted, a shear plate pivotally mounted upon said presser plate for movement with said plate toward the knife axis and for movement in the plane of said presser plate toward the path of said knife as it rotates through said pitting aperture, said shear plate having a shear edge defining a portion of said pitting aperture, spring means for so positioning said shear plate relative to the path of said knife as it rotates through said pitting aperture that the shear edge thereof contacts said knife as the knife emerges from a fruit half during the pitting operation, and drive mechanism operatively associated with said conveyor and operatively connected to said pitting knife for rotating said pitting knife a full revolution to perform a pitting operation while the pitter unit is moving in the same direction as said conveyor and holding said knife against rotation while the pitter head is moving in a direction opposite that of said conveyor.

10. In a fruit feeding machine as set forth in claim 9 wherein the pitting knife is a helicoidal blade having a helicoidal cutting edge and an outer face having a bevel surface adjacent said cutting edge, and wherein the shear edge of said shear plate is bevelled to contact the bevel surface of said knife behind said cutting edge at a point progressively moving from one end of the knife to the other as the knife emerges from a fruit half during the pitting operation.

References Cited in the file of this patent

UNITED STATES PATENTS

| | | |
|---|---|---|
| 1,264,372 | Cushen | Apr. 30, 1918 |
| 1,671,587 | Johnson | May 29, 1928 |
| 1,915,447 | Robbins | June 27, 1933 |
| 2,061,051 | Thompson | Nov. 17, 1936 |
| 2,226,664 | Jepson | Dec. 31, 1940 |
| 2,380,530 | Jepson | July 31, 1945 |
| 2,443,863 | Lindley | June 22, 1948 |
| 2,496,637 | Pease | Feb. 7, 1950 |
| 2,551,076 | Waters | May 1, 1951 |
| 2,629,416 | Luther | Feb. 24, 1953 |
| 2,629,417 | Harrer | Feb. 24, 1953 |
| 2,705,036 | Fox | Mar. 29, 1955 |
| 2,705,037 | Fox et al. | Mar. 29, 1955 |

UNITED STATES PATENT OFFICE

CERTIFICATION OF CORRECTION

Patent No. 2,962,068                  November 29, 1960

Thomas B. Keesling

It is hereby certified that error appears in the above numbered patent requiring correction and that the said Letters Patent should read as corrected below.

Column 1, between lines 12 and 15, insert the following paragraph:

This invention relates to fruit processing machines and particularly to improved machines for removing the pits from drupaceous fruit.

Signed and sealed this 30th day of May 1961.

(SEAL)
Attest:

ERNEST W. SWIDER
Attesting Officer

DAVID L. LADD
Commissioner of Patents